US011661093B2

(12) United States Patent
Vichier Guerre

(10) Patent No.: US 11,661,093 B2
(45) Date of Patent: May 30, 2023

(54) METHOD AND INSTALLATION FOR TRANSPORTING VEHICLES HAULED BY A CABLE

(71) Applicant: POMA, Voreppe (FR)

(72) Inventor: Jean-Pierre Vichier Guerre, Voiron (FR)

(73) Assignee: POMA, Voreppe (FR)

( * ) Notice: Subject to any disclaimer, the term of this patent is extended or adjusted under 35 U.S.C. 154(b) by 573 days.

(21) Appl. No.: 15/839,404

(22) Filed: Dec. 12, 2017

(65) Prior Publication Data

US 2018/0162417 A1    Jun. 14, 2018

(30) Foreign Application Priority Data

Dec. 12, 2016   (FR) ...................................... 1662298

(51) Int. Cl.
*B61B 12/06*     (2006.01)
*B61B 12/00*     (2006.01)
*G06V 20/59*     (2022.01)

(52) U.S. Cl.
CPC ............ *B61B 12/06* (2013.01); *B61B 12/002* (2013.01); *G06V 20/593* (2022.01)

(58) Field of Classification Search
CPC ........... G06K 9/00838; G06K 9/00832; G06K 9/00362; G06K 9/00369; B61B 12/002; B61B 12/06; B61B 12/005; B61B 12/007; B61B 7/045; B61B 12/00; B61B 12/10; B61B 11/00; B61K 13/04; G06V 20/593
See application file for complete search history.

(56) References Cited

U.S. PATENT DOCUMENTS

| 6,035,787 | A  | * | 3/2000 | Mutaguchi | .............. | B61B 12/04 |
| | | | | | | 105/148 |
| 10,157,413 | B2 | * | 12/2018 | Landers, Jr. | ........ | G06K 9/00221 |
| 10,414,418 | B2 | * | 9/2019 | Martin | ..................... | B61B 12/00 |
| 10,457,306 | B2 | * | 10/2019 | Cho | .................... | B61L 27/04 |
| 10,521,651 | B2 | * | 12/2019 | Hodge | ................... | H04N 5/247 |
| 10,550,622 | B2 | * | 2/2020 | Kobler | ...................... | B61B 1/02 |
| 2004/0130442 | A1 | * | 7/2004 | Breed | .................... | G02B 27/01 |
| | | | | | | 340/443 |
| 2004/0201738 | A1 | * | 10/2004 | Moores, Jr. | ........ | H04N 1/00137 |
| | | | | | | 348/231.2 |
| 2011/0038412 | A1 | * | 2/2011 | Jung | .................... | H04N 19/593 |
| | | | | | | 375/240.12 |
| 2012/0103225 | A1 | | 5/2012 | Gubler | | |

(Continued)

FOREIGN PATENT DOCUMENTS

| EP | 3 009 993 A1 | 4/2016 | | |
| EP | 3088271 A1 | * 11/2016 | .......... | B61B 12/002 |

(Continued)

OTHER PUBLICATIONS

Machine translation of JP-2007326442-A, 2017 (Year: 2017).*

*Primary Examiner* — Nathnael Aynalem
(74) *Attorney, Agent, or Firm* — Oliff PLC

(57) ABSTRACT

Installation for transporting vehicles hauled by a cable, including an image acquisition system generating an image representative of a compartment of a vehicle, and an electronic control unit retrieving an identifier of the vehicle and recording the identifier and the representative image associated with the identifier in a non-volatile memory.

19 Claims, 1 Drawing Sheet

(56) References Cited

U.S. PATENT DOCUMENTS

| | | | |
|---|---|---|---|
| 2013/0309977 A1* | 11/2013 | Heines | G06F 8/70 |
| | | | 455/67.7 |
| 2015/0062340 A1* | 3/2015 | Datta | H04N 5/2252 |
| | | | 348/148 |
| 2016/0102490 A1 | 4/2016 | Kobler et al. | |
| 2017/0068863 A1* | 3/2017 | Rattner | G06K 9/00838 |

FOREIGN PATENT DOCUMENTS

| | | | |
|---|---|---|---|
| JP | 2007-326442 A | 12/2007 | |
| JP | 2007326442 A * | 12/2007 | |
| WO | 2012/172198 A1 | 12/2012 | |
| WO | WO-2012172198 A1 * | 12/2012 | G06K 9/00771 |
| WO | 2013/182803 A1 | 12/2013 | |

* cited by examiner

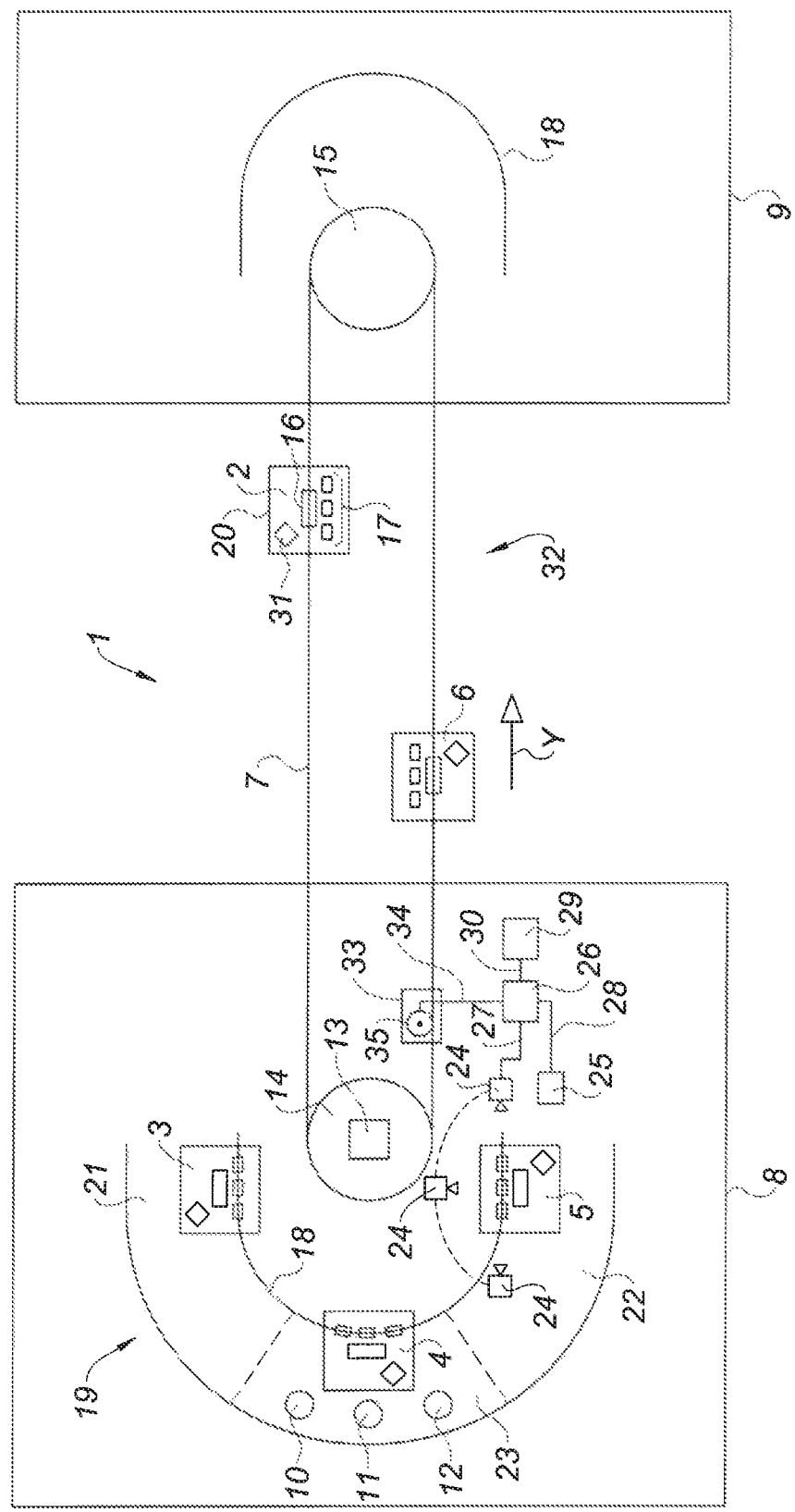

METHOD AND INSTALLATION FOR TRANSPORTING VEHICLES HAULED BY A CABLE

BACKGROUND OF THE INVENTION

The invention relates to transport of vehicles hauled by a cable, and more particularly to transport of vehicles by aerial hauling cable.

State of the Art

Transport installations of persons by aerial hauling cable, such as aerial cable cars, gondola lifts or chairlifts, are dependable and provide the users with a comfortable means of transport. However, breakdowns may exceptionally occur when the passengers are present in the vehicles. In rare cases, it is also possible not to be able to restart the installation and blocked passengers remain suspended above the ground until the authorized personnel take action to evacuate them. The intervention then consists in a vertical evacuation by helicopter or rappelling.

At the present time, it is not possible to know precisely which persons are in which vehicle and how many passengers there are in each of the vehicles. Children or persons with reduced mobility may in fact board the vehicles, and if the installation cannot restart, the evacuation means have to be adapted according to the persons to be evacuated. Furthermore, the evacuation means also have to be adapted according to the number of persons present in the vehicles to be evacuated.

Safety devices exist to control loading of passengers on chairlifts. International application WO2013/182803 can for example be cited which discloses a safety control device for a chairlift chair, comprising a three-dimensional camera to detect the presence of at least one passenger on the chair. But this device does not enable the state of the running line of the vehicles to be known, i.e. where the passengers are located and how many passengers have boarded the vehicles. This device is moreover specific to chairlifts and is not suitable for gondola lifts and aerial cable cars.

It is therefore advantageous to provide means for knowing the distribution of the passengers on the running line of the vehicles in order to optimize the evacuation means in the event of breakdowns.

Object of the Invention

One object of the invention consists in palliating these shortcomings, and more particularly in providing means for making suitable choices to cope with an evacuation situation on the running line of a cable transport installation.

According to one feature of the invention, a Method for transporting vehicles hauled by a cable is proposed comprising an initial step in which an image representative of a vehicle compartment is generated.

The method further comprises the following steps:
retrieving an identifier of the vehicle, and
registering the identifier and the representative image associated with the identifier in a non-volatile memory.

The content of a vehicle can thus be characterized by retrieving the vehicle identifier and an image representative of the content of the vehicle associated with the latter.

The cable can define a running line of the vehicles connecting two stations, and the method comprises an identification step of a position of the vehicle on the running line.

As the position of the vehicles on the running line and the content of the vehicles are known, it can be decided to restart the installation, if this is possible, to move a vehicle containing several passengers so that it is close to a line pillar to facilitate evacuation of these passengers. Such a method facilitates evacuation of the passengers as it offers the possibility of selecting the vehicles which have to be evacuated as a priority, according to their positions with respect to the nature of the terrain and the occupancy rate of the vehicles.

The position of the vehicle can be identified from a calculation of a length of the cable between the vehicle and a reference position.

The initial step can be performed when the vehicle is positioned in a departure area in which passengers cannot board the vehicle.

The method can comprise a step of determining a number of passengers present in the vehicle compartment from the representative image.

Each passenger can comprise an element provided with a radiofrequency identification tag emitting data characteristic of the passenger, and the determining step further comprises a retrieval of the data characteristic of the passengers aboard the vehicle.

The vehicle identifier can be located on the vehicle compartment, the representative image is generated from an image acquisition system, and the retrieval step of the vehicle identifier comprises a recognition of the vehicle identifier from the representative image.

According to one feature of the invention, an installation for transporting vehicles hauled by a cable is proposed comprising an image acquisition system generating an image representative of a vehicle compartment.

The installation comprises:
acquisition means configured to retrieve an identifier of the vehicle, and
an electronic control unit recording the identifier and the representative image associated with the identifier in a non-volatile memory.

The installation can comprise two stations, the cable defining a running line of the vehicles connecting the two stations, and locating means configured to identify a position of the vehicle on the running line.

The locating means can identify the position of the vehicle from a calculation of a length of the cable between the vehicle and a reference position.

The installation can comprise a departure area in which passengers cannot board the vehicles, the image acquisition system being arranged to generate the image representative of the vehicle compartment when the vehicle is positioned in the departure area.

The electronic control unit can be configured to determine a number of passengers present in the vehicle compartment from the representative image.

The image acquisition system can be a video camera or an infrared thermal camera.

Each passenger can comprise an element provided with a radiofrequency identification tag emitting data characteristic of the passenger, and the installation comprises a radiofrequency apparatus arranged to retrieve the data characteristic of the passengers aboard the vehicle and to transmit them to the electronic control unit further configured to determine the number of passengers present in the vehicle compartment from the retrieved data.

The vehicle identifier can be located on the vehicle compartment, the image acquisition system is a video camera and the acquisition means are configured to retrieve the vehicle identifier from the representative image.

BRIEF DESCRIPTION OF THE DRAWINGS

Other advantages and features will become more clearly apparent from the following description of particular embodiments and implementation means of the invention given for non-restrictive example purposes only and represented in the appended drawing, in which FIG. 1 schematically illustrates an embodiment of an installation for transporting vehicles hauled by a cable.

DETAILED DESCRIPTION

An embodiment of a transport installation 1 of vehicles 2 to 6 hauled by a cable 7 has been represented in FIG. 1. The installation 1 can comprise a single vehicle or several vehicles 2 to 6. The installation 1 can be of any type, for example of monocable or bicable type, with fixed or detachable grips, with continuous or back-and-forth running. A monocable installation comprises a single cable which is both carrying and hauling cable, a bicable installation comprises at least one hauling cable and at least one carrying cable. A fixed-grip installation comprises vehicles which are attached in permanent manner to the hauling cable, a detachable-grip installation comprises vehicles attached in removable manner to the hauling cable. A continuous-running installation comprises a hauling cable which runs in a closed loop between two terminal stations of the installation and the vehicles run in continuous manner along the hauling cable. A back-and-forth running installation comprises a hauling cable which also runs in a closed loop between two terminal stations and a vehicle which runs back and forth between the two terminal stations while remaining on the same line. The hauling cable can further be an aerial cable or a ground cable. When the hauling cable is aerial, the cable is situated above the ground and the vehicles are attached to the cable and kept above the ground, and the transport installation 1 is then said to be an aerial cable car. The vehicles 2 to 6 are preferably suitable for transporting people. An aerial cable car can be a chairlift and the vehicles are chairs, a gondola lift and the vehicles are closed cars, or a mixed cable car and the installation comprises both closed cars and chairs. When the hauling cable is a ground cable, the cable is situated at ground level and the vehicles are either supported by rails or carrying cables located at ground level and the transport installation is a funicular, or the vehicles are guided by slides located at ground level and the transport installation is an air cushion train.

In FIG. 1, an installation 1 of monocable gondola lift type with detachable grips and continuous running has been represented. The installation 1 comprises two terminal stations 8, 9 for loading/unloading of passengers 10 to 12 on/off vehicles 2 to 6. The installation 1 further comprises a drive station 8 equipped with a motor 13 to drive a driving pulley 14 in rotation to drive the hauling cable 7 in a direction of movement Y. The second terminal station 9, called return station, comprises a return pulley 15 which keeps the hauling cable 7 taut between the two terminal stations 8, 9.

The vehicles 2 to 6 comprise a grip 16 to attach them to the hauling cable 7. The grip 16 can be fixed and in this case the vehicles 2 to 6 are attached in permanent manner to the cable 7. The grip 16 can be detachable and in this case the vehicles 2 to 6 are attached in removable manner to the cable 7. When the grips 16 are detachable, the vehicles 2 to 6 comprise lateral wheels 17 designed to run on bypass circuits 18 so as to move the vehicles 2 to 6 at a lower speed than that of the hauling cable 7 to facilitate loading/unloading of the passengers 10 to 12 on/off the vehicles 2 to 6. When the vehicles 2 to 6 are detached from the hauling cable 7, they then run in the stations 8, 9 at a lower speed than that of the hauling cable 7. In order to move the vehicles 2 to 6 on the bypass circuit 18, the vehicles 2 to 6 can be equipped with a plate, not represented for the sake of simplification, on which rotary sheaves, also called tires, press and which push the vehicles 2 to 6 to move them along the bypass circuit 18. When the grips 16 of the vehicles 2 to 6 are fixed, running of the vehicles 2 to 6 in the terminal stations 8, 9 is accomplished by means of the hauling cable 7 on which the vehicles 2 to 6 are attached.

The installation 1 comprises a loading platform 19 where the passengers 10 to 12 wait before boarding the vehicles 2 to 6. The vehicles 2 to 6 comprise a compartment 20 designed to receive one or more passengers 10 to 12. The compartment 20 can comprise seats for the passengers 10 to 12 to sit on, or simply a platform and the passengers board the vehicles 2 to 6 and remain standing. For example, the compartment 20 is a closed car and the installation 1 is a gondola lift. The compartment 20 can also be a chair having one or more seats and the installation 1 is a chairlift or a mixed cable car.

The loading platform 19 comprises an arrival area 21 of the vehicles 2 to 6, a departure area 22 of the vehicles 2 to 6, and a loading area 23 situated between the two areas 21, 22. The loading area 23 corresponds to an area in which the passengers 10 to 12 wait until a vehicle 4 is running in the loading area 23 to board the vehicle 4. When a vehicle 5 is running in the departure area 22, no passengers can henceforth board the vehicle 5.

The installation 1 further comprises an image acquisition system 24, acquisition means 25, and an electronic control unit 26 connected to the image acquisition system 24 and to the acquisition means 25 by respective connections 27, 28. The installation 1 also comprises a non-volatile memory 29 which can either be connected to the electronic control unit 26 by a connection 30 or be integrated in the electronic control unit 26. Furthermore, at least one vehicle 2 to 6 comprises an identifier 31. The identifier 31 is an element which comprises data characterizing the vehicle 2 to 6 and which enables the vehicle to be differentiated from another vehicle of the installation 1. The electronic control unit 26 is furthermore a set of logic circuits, for example a microprocessor or a set of microprocessors. The electronic control unit 26 can be embedded in a computer or a programmable controller.

In general manner, the image acquisition system 24 generates an image representative of a compartment 20 of a vehicle 2 to 6. The image acquisition system 24 can also generate several different images of the compartment 20. The system 24 can be mounted fixed on a support of a station 8, 9 of the installation 1. The installation 1 can comprise several systems respectively situated at several locations of a station 8, 9 to generate different images representative of a same compartment 20 of vehicles 2 to 6 with different viewing angles. As a variant, an image acquisition system 24 can be provided that is mounted mobile to take several images with different viewing angles. For example, the system 24 can move, as represented in dotted lines in FIG. 1, from a reference position where it generates a first image of a front face of the compartment 20, and then occupy a lateral position where it generates a second image of the lateral face of the compartment 20, and then move to a rear position where it generates a third image of the rear face of the compartment 20. In general manner, the image representative of the compartment 20 of a vehicle 2 to 6 enables retrieval of data concerning the number of passengers present in the vehicle 2 to 6, as well as certain characteristics of the passengers, such as for example their kind, whether they are children or adults.

More particularly, the image acquisition system 24 is a digital system configured to generate digital images. In general manner, the system 24 comprises an optic sensor and image processing means. The optic sensor is a photosensitive device designed to convert an electromagnetic radiation, of visible or infrared to type, into digital data which it transmits to the image processing means. The image processing means generate a digital image from the received digital data. These processing means can be integrated in the optic sensor and these optic sensors are then called optic cameras. When the optic sensor converts an infrared electromagnetic radiation into a digital image, the optic camera is said to be an infrared thermal camera. When it comprises an optic sensor which converts a visible electromagnetic radiation into a digital image, the camera is said to be a video camera. The processing means can also be remotely located, for example in the electronic control unit 26. The optic sensor can further be two-dimensional or three-dimensional to process digital data enabling two-dimensional or three-dimensional images to be respectively generated.

The acquisition means 25 are configured to retrieve the identifier 31 of a vehicle 2 to 6. In other words, the acquisition means 25 retrieve the data characterizing the vehicle 2 to 6. The electronic control unit 26 receives the image, or images, representative of the compartment 20 of the vehicle 2 to 6, and the retrieved identifier 31. Then the electronic control unit 26 records this data in the non-volatile memory 29. More particularly, the electronic control unit 26 associates the image, or set of images, representative of the compartment 20 of a vehicle 2 to 6 with the retrieved identifier 31 of the vehicle 2 to 6. This association can be performed by creating a digital file corresponding to the representative image and by including the identifier 31 in the created file. As a variant, the electronic control unit 26 records a link in the non-volatile memory 29, the link enabling coupling the image representative of the compartment 20 of the vehicle 2 to 6 with the identifier 31 of the vehicle 2 to 6. In other words, the electronic control unit 26 records the image representative of a vehicle 2 to 6 associated with the identifier 31 of the vehicle 2 to 6 in the memory 29. This association enables the image representative of a vehicle 2 to 6 to be retrieved from the retrieval of the identifier 31 of the vehicle 2 to 6 in the non-volatile memory 29. The number and type of passengers aboard the vehicle 2 to 6 can then be known. By retrieving all the recorded identifiers 31 and their associated representative images, the state of the running line 32 can be known. The running line 32 is defined by the hauling cable 7 and corresponds to the area where the vehicles 2 to 6 run.

More particularly, for each vehicle 2 to 6 running within a specific area of the running line 32, the image acquisition system 24 generates an image representative of a compartment of the vehicle 2 to 6 and the acquisition means retrieve the identifier 31 of the vehicle 2 to 6. Furthermore, for each vehicle running within the specific area, the electronic control unit 26 records the identifier 31 of the vehicle 2 to 6 and the image representative of the compartment 20 of the vehicle 2 to 6 associated with the identifier 31. The specific area can be situated at the level of a pillar of the running line 32 placed between the stations 8, 9. Preferably, the specific area corresponds to the departure area 22.

The identifier 31 can be a mark fixed on the vehicle 2 to 6, for example a number, a name, or a combination of figures and letters. In this case, the image acquisition system 24 can be a two-dimensional or three-dimensional video camera, and the acquisition means are embedded in the electronic control unit 26 or in the video camera 24. The acquisition means 25 are then configured to retrieve the identifier 31 of the vehicle 2 to 6 from the generated representative image. For example, the acquisition means 25 are equipped with a software application which uses computing algorithms to recognize the identifier 31 noted on the vehicle 2 to 6 in the representative image.

As a variant, the identifier 31 can be a radiofrequency identification tag configured to receive a signal emitted by a radiofrequency apparatus and to emit a signal containing the data characterizing the vehicle 2 to 6 to the radiofrequency apparatus. In this case, the acquisition means 25 comprise a radiofrequency apparatus configured to process the signal emitted by the tag 31 and to recover the data characterizing the vehicle 2 to 6.

In order to improve the precision with which the state of the running line 32 is known, the installation 1 can further comprise locating means 33 configured to identify respective positions of the vehicles 2 to 6. The locating means 33 are connected to the electronic control unit 26 by the connection 34. The identified positions of the vehicles 2 to 6 can be periodically recorded by means of the electronic control unit 26 in the non-volatile memory 29. Advantageously, the recorded position of a vehicle 2 to 6 is also associated with the identifier 31 of the vehicle 2 to 6. When the identifier 31 of the vehicle 2 to 6 is retrieved, its position on the line 32 and the content of the vehicle 2 to 6 can thereby be known.

For example, the locating means 33 comprise a rotary encoder 35 placed in contact with the hauling cable 7 and connected to the electronic control unit 26 by the connection 34. The rotary encoder 35 measures its rotation to deduce therefrom a length of the hauling cable 7 which has passed with respect to a reference position. For example, the reference position can be the position of the rotary encoder 35 in the station 8, 9. The electronic control unit 26 retrieves the current length of the hauling cable 7 which has passed. Furthermore, when a vehicle 2 to 6 passes in a specific area of the installation 1, for example the departure area 22, the electronic control unit 26 records the current cable length and updates the cable lengths respectively associated with the vehicles 2 to 6 running along the line. Updating consists in replacing the cable length associated with a vehicle by the current value of the cable length from which the previous value of the cable length associated with the vehicle is subtracted. In this case, the position of a vehicle 2 to 6 with respect to the reference position can be known at any time. Knowledge of the state of the running line 32 is therefore more precise which enhances optimization of the rescue means to be implemented in case of a possible breakdown of the installation 1.

As a variant, the locating means 19 comprise a global positioning system configured to identify the respective positions of the vehicles 2 to 6 from signals emitted by the vehicles 2 to 6. Each vehicle 2 to 6 further comprises a radiofrequency emitter designed to emit signals which contain at least the data indicating the position of the vehicle 2 to 6 on the running line 32. The radiofrequency emitter of a vehicle 2 to 6 retrieves the position of the vehicle 2 to 6 from a communication with a group of satellites. Each vehicle 2 to 6 also comprises a power storage unit connected to the radiofrequency emitter.

More particularly, the digital camera 24 is arranged to generate an image representative of a vehicle 2 to 6 when the vehicle is positioned in the departure area 22. For this purpose, the vehicle 24 is placed in the departure area 22. In this way the content of the vehicle 2 to 6 is guaranteed to be final as no passengers can henceforth board the vehicle 2 to 6. A simple and efficient means is provided to determine the occupancy rate of a vehicle. It is in fact difficult to know the occupancy rate of a vehicle running in a station 8, and more particularly in the loading area 23, as the passengers 10 to 12 can enter and exit the vehicle, or wait on the platform 19 without boarding a vehicle. Furthermore, there is no longer the necessity to equip the vehicles 2 to 6 with bulky, power-consuming detection systems, as the vehicles are not generally equipped with a power storage unit.

Advantageously, the electronic control unit 26 is configured to determine a number of passengers present in the compartment 20 of the vehicle 2 to 6 whose identifier 31 has been retrieved. The number of passengers who have boarded a vehicle 2 to 6 can thus be determined in automated manner. In general manner, the electronic control unit 26 comprises a software application which uses computing algorithms to recognize the passengers present in the vehicle 2 to 6 in the representative image.

When the image acquisition system 24 is a video camera, the software application comprises computing algorithms to recognize the shapes characteristic of the passengers present in the representative image in order to differentiate the passengers aboard the vehicle. When the image acquisition system 24 is an infrared thermal camera, the software application comprises computing algorithms to recognize the areas characteristic of the passengers present in the representative image in order to differentiate the passengers aboard the vehicle. In this way, whatever the type of camera used, the electronic control unit 26 can count the passengers present in the compartment 20 of the vehicle 2 to 6.

Another method for determining the number of passengers aboard a vehicle can also be envisaged. For example, each passenger 10 to 12 comprises an element provided with a radiofrequency identification tag emitting data characteristic of the passenger, and the acquisition means 25 comprise a radiofrequency apparatus arranged to retrieve the data characteristic of the passengers aboard the vehicle. The radiofrequency apparatus 25 transmits this data via the connection 28 to the electronic control unit 26. The electronic control unit 26 is further configured to determine the number of passengers present in the compartment 20 of the vehicle 2 to 6 from the retrieved data. The electronic control unit 26 can compare the number of passengers present in the compartment 20 determined from the representative image with the number determined from the data retrieved by the radiofrequency apparatus so as to estimate in robust manner the number of passengers actually present in the vehicle. Determination of the occupancy rate of the vehicle is thus improved.

A method for transporting vehicles hauled by a cable 7 can be implemented by the installation 1 which has just been described above. The method comprises the following main steps:
generating an image representative of a compartment 20 of a vehicle 2 to 6,
retrieving an identifier 31 of the vehicle 2 to 6, and
recording the identifier 31 and the representative image associated with the identifier 31 in a non-volatile memory 29.

The invention which has just been described is particularly suitable for any type of aerial cable car or funicular.

The invention claimed is:

1. A method for transporting a plurality of vehicles hauled by a cable, comprising:
providing two stations for loading passengers on a vehicle of the plurality of vehicles and for unloading passengers from said vehicle;
generating at least one image representative of a compartment of the vehicle of the plurality of vehicles by means of a camera mounted to a station of the two stations outside the plurality of vehicles, the camera being mounted mobile with respect to the station and with respect to the plurality of vehicles and configured to generate several images, the at least one image comprising the several images having different viewing angles to allow computation of a number of passengers in the compartment of the vehicle;
retrieving an identifier of the vehicle; and
recording the identifier and the at least one image representative of the compartment of the vehicle associated with the identifier in a non-volatile memory located in one of the two stations, the non-volatile memory storing the identifier and the at least one image representative of the compartment of a vehicle associated with the identifier of each vehicle hauled by the cable between the two stations;
wherein when an evacuation situation occurs, the method further comprises:
counting a number of passengers for each vehicle, the number of passengers being computed from the at least one image representative of the compartment of each vehicle by means of an electronic control unit located in said one of the two stations and connected to the non-volatile memory;
determining a position of each vehicle along the cable; and
selecting a priority of vehicles of the plurality of vehicles to evacuate based on the position of each vehicle along the cable, and the number of passengers of each vehicle.

2. The method according to claim 1, wherein providing a number of passengers for each vehicle is providing an occupancy rate for each vehicle.

3. The method according to claim 2, wherein the position of each vehicle of the plurality of vehicles is identified from a calculation of a length of the cable between each vehicle and a reference position.

4. The method according to claim 1, wherein generating the at least one image representative of the compartment of a vehicle is performed when each vehicle is positioned in a departure area in which passengers cannot board the vehicle.

5. The method according to claim 1, comprising determining a number of passengers present in the compartment of the vehicle from the generated at least one image representative of the compartment of the vehicle and wherein each passenger comprises an element provided with a radiofrequency identification tag emitting data characteristic of the passenger, and determining the number of passengers further comprises retrieving the data characteristic of the passengers aboard the compartment of the vehicle.

6. The method according to claim 1, wherein the identifier of the vehicle is located on the vehicle compartment, the at least one image representative of the compartment of the vehicle is generated from the camera, and retrieving the identifier of the vehicle comprises recognizing the identifier of the vehicle from the generated at least one image representative of the compartment of the vehicle.

7. An installation for transporting a plurality of vehicles hauled by a cable, comprising:
- two stations for loading passengers on a vehicle of the plurality of vehicles and for unloading passengers from said vehicle
- an image acquisition system generating an image representative of a compartment of the vehicle of the plurality of vehicles, the image acquisition system comprising a camera mounted to a station of the two stations outside the plurality of vehicles, the camera being mounted mobile with respect to the station and with respect to the plurality of vehicles; the image acquisition system being configured to generate several images of the compartment with different viewing angle, and
- an electronic control unit retrieving an identifier of the vehicle and recording the identifier and the representative image associated with the identifier in a non-volatile memory located in one of the two stations, the non-volatile memory storing the identifier and the at least one image representative of the compartment of a vehicle associated with the identifier of each vehicle hauled by the cable between the two stations,
- an electronic control unit located in said one of the two stations and connected to the non-volatile memory, the electronic control unit being configured to count a number of passengers for each vehicle, the number of passengers being computed from the at least one image representative of the compartment of each vehicle
- wherein when an evacuation situation occurs, a number of passengers for each vehicle is provided by the electronic control unit; a position of each vehicle along the cable is provided; and a priority of vehicles of the plurality of vehicles to evacuate is provided, the priority being based on the position of each vehicle along the cable, and the number of passengers of each vehicle.

8. The installation according to claim 7, the cable defining a running line of the plurality of vehicles connecting the two stations, and a locating device configured to identify a position of the plurality of vehicles on the running line.

9. The installation according to claim 8, wherein the locating device identifies the position of each vehicle from a calculation of a length of the cable between each vehicle and a reference position.

10. The installation according to claim 7, comprising a departure area in which passengers cannot board the vehicles, the image acquisition system being arranged to generate the image representative of the vehicle compartment when the vehicle is positioned in the departure area.

11. The installation according to claim 10, wherein each vehicle has a platform so that passengers remain standing in each vehicle and wherein the electronic control unit determines a number of passengers present in the compartment of the vehicle from the representative image.

12. The installation according to claim 7, wherein the image acquisition system is a video camera or an infrared thermal camera.

13. The installation according to claim 7, wherein each passenger comprises an element provided with a radiofrequency identification tag emitting data characteristic of the passenger, the electronic control unit comprising a radiofrequency apparatus retrieving the data characteristic of the passengers aboard the vehicle and transmitting them to the electronic control unit that further determines the number of passengers present in the compartment of the vehicle from the retrieved data.

14. The installation according to claim 7, wherein the identifier of each vehicle is located on a compartment of each vehicle, the image acquisition system is a video camera and the electronic control unit retrieves the identifier of each vehicle from the representative image.

15. The method according to claim 1, comprising a departure area in which passengers cannot board the vehicles, the camera being arranged to generate the image representative of the vehicle compartment when the vehicle is positioned in the departure area, the camera being mounted fixed on the station or the camera being mounted movable with respect to the plurality of vehicles and movable with respect to the station.

16. The method according to claim 15, comprising a detachable-grip installation and wherein the vehicles are attached in removable manner to the hauling cable.

17. A method for transporting a plurality of vehicles hauled by a cable, comprising:
- running a vehicle of the plurality of vehicles in an installation having two stations for loading passengers on the vehicle and for unloading passengers from said vehicle, a station of the two stations comprising an image acquisition system attached to the station and configured to acquire several images of the vehicle with different viewing angles;
- using the image acquisition system to generate said several images representative of a compartment of the vehicle, the image acquisition system comprising a camera mounted to a station outside the plurality of vehicles, the camera being mounted mobile with respect to the station and with respect to the plurality of vehicles, the several images allowing counting a number of passengers in the compartment of the vehicle;
- retrieving an identifier of the vehicle; and
- recording the identifier and the several images representative of the compartment of the vehicle associated with the identifier in a non-volatile memory located in one of the two stations,
- wherein when an evacuation situation occurs, the method further comprises:
  - providing an occupancy rate for each vehicle computed from the several images representative of the compartment of each vehicle recorded in the non-volatile memory;
  - determining a position of each vehicle along the cable; and
  - selecting a priority of vehicles of the plurality of vehicles to evacuate based on the position of each vehicle along the cable, and the occupancy rate of each vehicle.

18. The method according to claim 17, further comprising a restart of the installation is realized after a stop of the installation and according to the position of the vehicles along the running lines and according to a content of each vehicle.

19. The method according to claim 1, wherein the vehicles are closed cars of a gondola lift.

* * * * *